United States Patent [19]

Kotake

[11] Patent Number: 5,090,747
[45] Date of Patent: Feb. 25, 1992

[54] COUPLING SOCKET

[75] Inventor: Naoyuki Kotake, Tokyo, Japan

[73] Assignee: Nitto Kohki Co., Ltd., Tokyo, Japan

[21] Appl. No.: 608,535

[22] Filed: Nov. 2, 1990

[30] Foreign Application Priority Data

Nov. 11, 1989 [JP] Japan .............. 1-131575[U]

[51] Int. Cl.$^5$ .......................................... F16L 37/26
[52] U.S. Cl. .................... 285/305; 285/317; 285/319
[58] Field of Search ............ 285/319, 305, 310, 317

[56] References Cited

U.S. PATENT DOCUMENTS

| 4,219,222 | 8/1980 | Brusadin | 285/319 X |
| 4,541,457 | 9/1985 | Blenkush | 137/614.06 |
| 4,561,682 | 12/1985 | Tisserat | 285/319 X |
| 4,681,350 | 7/1987 | Gaita | 285/319 X |
| 4,721,331 | 1/1988 | Lemelshtrich | 285/319 X |

FOREIGN PATENT DOCUMENTS

| 2731525 | 1/1978 | Fed. Rep. of Germany | 285/317 |
| 2442393 | 7/1980 | France | 285/319 |
| 51-91324 | 1/1976 | Japan . | |
| 1483157 | 8/1977 | United Kingdom . | |

Primary Examiner—Randolph A. Reese
Assistant Examiner—Heather Chun
Attorney, Agent, or Firm—Nixon & Vanderhye

[57] ABSTRACT

A coupling socket includes a main cylindrical body and a locking member. The main cylindrical body has a hole extending along its longitudinal axis and a rectangular hole formed on its plug-inserted portion and directed perpendicular to its hole. The locking member includes locking parts provided with ring-shaped pieces engageable with a locking groove on a plug. A plug hole is formed between the locking parts when one of the ring-shaped pieces is placed on the other. The plug hole is made wide when the locking parts approach each other and narrow when they separate from each other. The locking member is fitted into the rectangular hole of the main cylindrical body in such a way that the plug hole is aligned with the hole and that the locking parts is controlled from outside of the main cylindrical body to come close to and separated from each other. Springs are interposed between the main cylindrical body and the locking member to urge the locking parts to apart from each other.

2 Claims, 6 Drawing Sheets

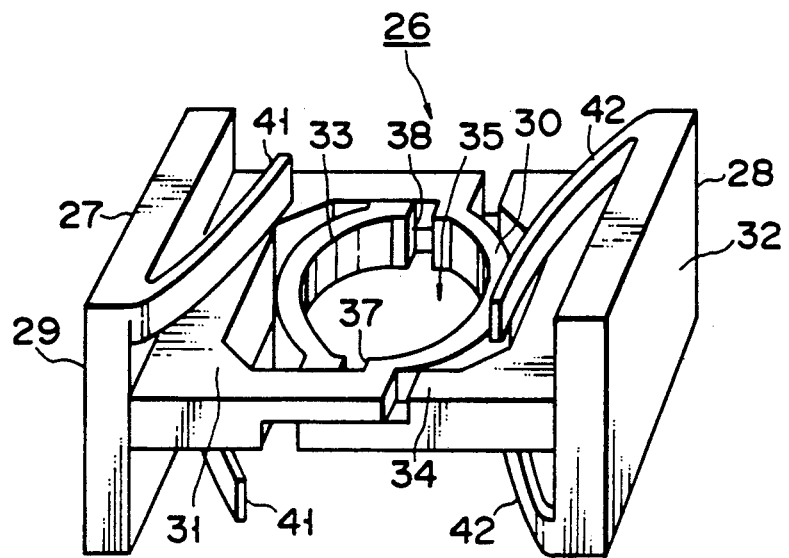
F I G. 4
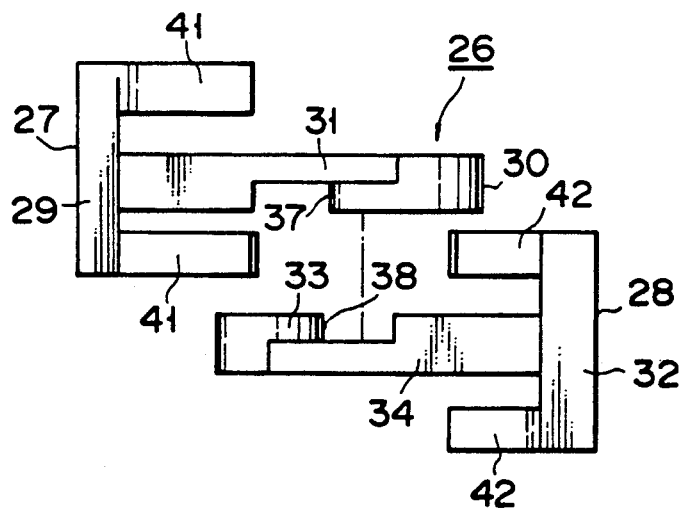
F I G. 5

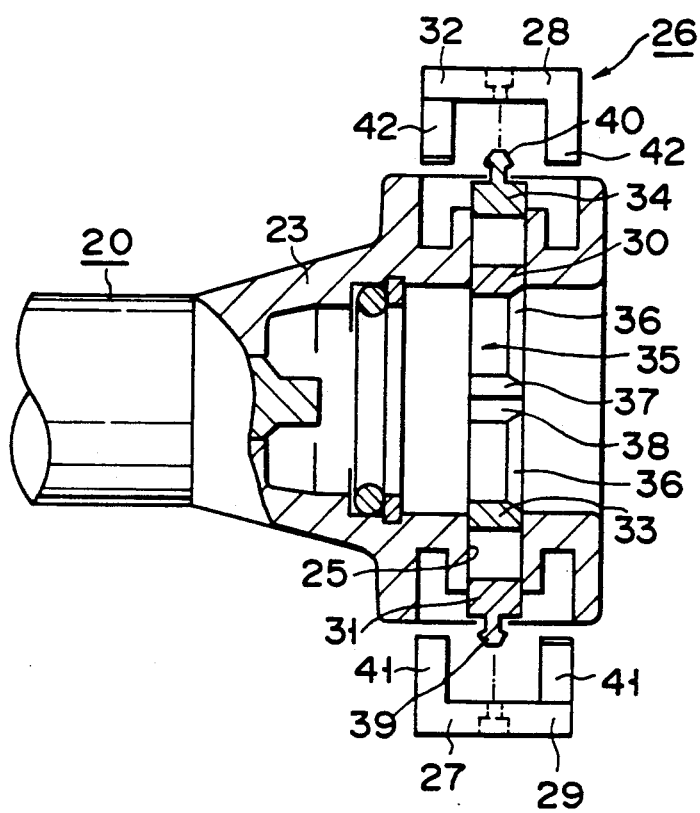
F I G. 8

COUPLING SOCKET

BACKGROUND OF THE INVENTION

1. Field of the Invention

The present invention relates to a coupling socket for allowing a hole in the coupling socket to be communicated with a hole in its corresponding plug and a locking member of the socket to be engaged with a locking groove on the outer circumference of the plug when the socket and the plug are connected to each other.

2. Description of the Related Art

The coupling which allows the hole in its socket to be communicated with the hole in its plug and the locking member of its socket to be engaged with the locking groove on the outer circumference of its plug when socket and plug are connected to each other changes its structure depending upon gas, fluid or the like for which it is used, or pressures of these matters under which it is used. Therefore, various kinds of structures are employed by the coupling and even in the case of the coupling which is used under low pressure, the structure employed by it is not necessarily simple. In addition, steel balls are used for the locking member and the arrangement of those members which are related to the locking mechanism is complicated. This makes the cost of the coupling high.

SUMMARY OF THE INVENTION

The object of the present invention is therefore to reduce the cost of the coupling which is used under low pressure and to enhance working efficiency in the course of manufacturing the couplings.

This object of the present invention can be achieved by a coupling socket including a plug provided with a first hole or bore therein and a socket provided with a second hole or bore and causing the first and the second hole to be communicated with each other and a locking member of the socket to be engaged with a locking groove on the plug when the plug is connected to its socket, said coupling socket comprising a main cylindrical body having the second hole therein, a plug-inserted portion, and a rectangular hole directed perpendicular to the second hole and formed on the plug-inserted portion; a locking member having locking parts provided with ring-shaped pieces engageable with the locking groove on the plug and also having such an arrangement that a plug hole formed between the locking parts when the ring-shaped pieces are placed one upon the other is made wide when the locking parts come close to each other and narrow when they are separated from each other; and springs interposed between the main cylindrical body and the locking member to urge the locking parts to separate from each other; wherein the locking member is fitted into the rectangular hole of the main cylindrical body in such a way that the plug hole is aligned with the second hole and that the locking parts are operated from outside the main cylindrical body to come close to and apart from each other.

According to the present invention, the locking member inserted into the rectangular hole of the main cylindrical body of the socket causes its locking parts to be urged to separate from each other by means of its springs which are interposed between the locking member and the main cylindrical body, so that the plug hole formed by the ring-shaped pieces of the locking parts can be kept narrow. When the locking parts are pushed to come close to each other against the springs, the plug hole can be widened. When the plug is to be connected to the socket which has the above-described locking member, the locking parts are caused to come close to each other so as to widen the plug hole. The plug is inserted into the main cylindrical body of the socket under this state. When the locking groove on the outer circumference of the plug reaches the inside of the plug hole formed by the locking parts and these locking parts are released they are separated from each other by the springs. As the result, the plug hole is made narrow and the ring-shaped pieces which form the plug hole are engaged with the locking groove on the outer circumference of the plug, so that the socket and the plug can be connected to each other. When the plug thus connected is to be detached from the socket, the locking parts are again pushed to come close to each other. When the plug hole is thus windened, the ring-shaped pieces are released from the locking groove on the plug, thereby enabling the plug to be separated from the socket.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 4 is an enlarged perspective view showing a locking member;

FIG. 5 is a side view showing the locking member dismantled;

FIG. 8 shows the locking member which is about to be fitted into a rectangular hole on a main cylindrical body of the socket.

DETAILED DESCRIPTION OF THE PREFERRED EMBODIMENTS

Figure 1:
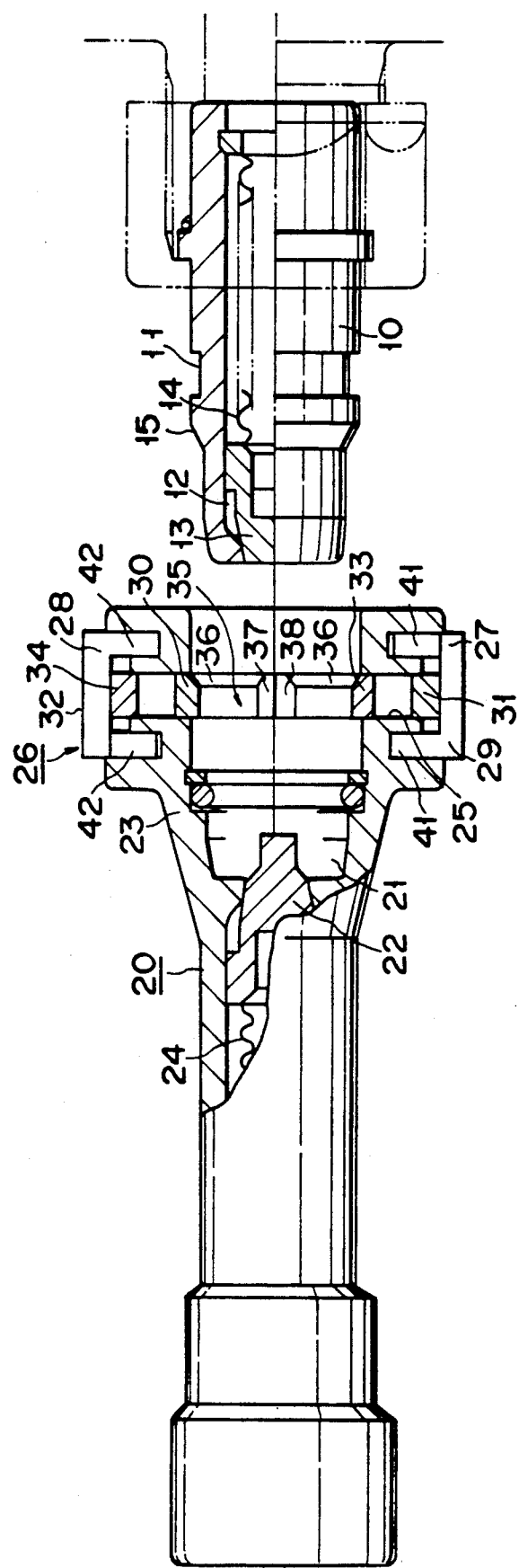
FIG. 1 is a partially-sectioned side view showing an example of the coupling socket according to the present invention, the socket being shown separated from its corresponding plug.

FIG. 1 is a partially-sectioned side view showing a plug 10 and a socket 20.

As apparent from FIG. 1, the plug 10 is of well-known type comprising a locking groove 11 formed on the outer circumference of the plug 10. A valve body 13 arranged in a hole 12 therein, and is struck against and displaced by a valve body 22 in a hole or bore 21 of the socket 20 when they are connected to each other so as to open the hole 12, and a spring 14 for urging the valve body 13 toward the front end of the plug 10. The plug 10, however, may be shaped to fit into the socket 20 of the present invention.

The socket 20 includes the valve body 22 arranged in the hole 21 of a main cylindrical body 23 into which the plug 10 is inserted, and struck against and displaced by the valve body 13 in the plug 10 to open the hole 21, and a spring 24 for urging the valve body 22 toward the front end of the socket 20. A rectangular hole 25 perpendicular to the hole 21 in the socket 20 is formed on the plug-inserted side of the main cylindrical body 23 and a locking member 26 is fitted into the rectangular hole 25.

Figure 7:
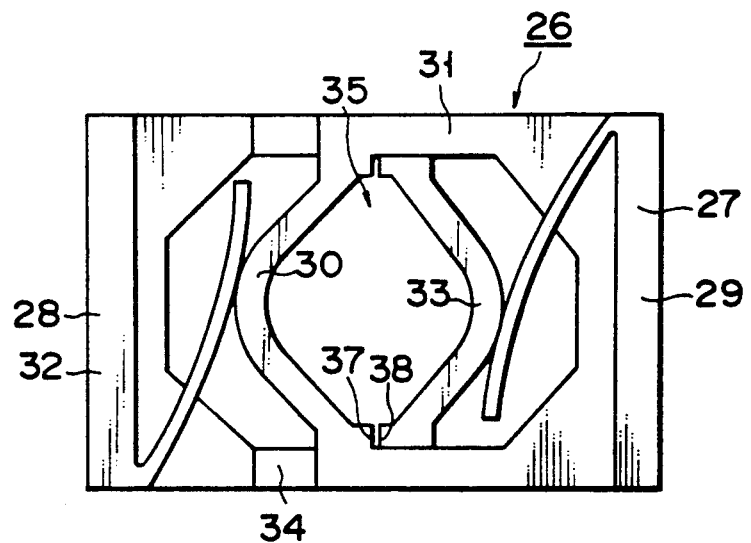
FIG. 7 shows the locking member whose plug hole is narrowed.

As shown in FIGS. 4 through 7, the locking member 26 comprises two locking parts 27 and 28. One locking part 27 includes a push piece 29 and a ring-shaped member 31. The ring-shaped member 31 has on the front side thereof a ring-shaped piece 30 engageable with the locking groove 11 of the plug 10, and the push piece 29 is fixed to the back side of the ring-shaped member 31. Similarly, the other locking part 28 includes a push piece 32 and a ring-shaped member 34 provided with a ring-shaped piece 33 on the front side thereof. These two locking parts 27 and 28 form a plug hole 35 between them by means of their ring-shaped pieces 30 and 33 in such a way that the ring-shaped piece 30 of the locking part 27 is fitted into the ring-shaped member 34 of the locking part 28 and the ring-shaped piece 33 of the locking part 28 into the ring-shaped member 31 of the locking part 27 while opposing the ring-shaped members 31 and 34 to each other and placing one of them upon the other. The plug hole 35 is widened because the ring-shaped pieces 30 and 33 are separated from each other when the locking parts 27 and 28 approach each other (FIG. 6) and it is narrowed because the ring-shaped pieces 30 and 33 comes nearer to each other when the locking parts 27 and 28 separate from each other (FIG. 7).

The plug hole 35 is widened to such an extent that the plug 10 can pass through and it is narrowed to such an extent that the ring-shaped pieces 30 and 33 can be fitted into the locking groove 11 of the plug 10. Each thickness of the ring-shaped pieces 30 and 33 in the radial direction is set to have such a dimension that allows it to fit into the locking groove 11 of the plug 10. A tapered face 36 is formed on the inner circumference of each of the ring-shaped pieces 30 and 33 at the plug-inserted side thereof.

The ring-shaped members 31 and 34 are provided with stoppers 37 and 38 which are engaged with each other, on the way of separating the locking parts 27 and 28 from each other, to stop the locking parts 27 and 28 not to separate from each other to unnecessary extent. As the result, the plug hole 35 formed by the ring-shaped pieces 30 and 33 can be controlled not to become smaller than the diameter of a circle formed by the bottom of the locking groove 11 of the plug 10. As shown in FIG. 8, the push pieces 29 and 32 are members independent of the ring-shaped members 31 and 34 and they are fixed to the ring-shaped members 31 and 34 by means of fixing pieces 39 and 40, respectively.

Each of the push pieces 29 and 32 has a size larger than the rectangular hole 25 of the main cylindrical body 23 and they are provided with springs 41 and 42 which are elastic tongues pressed against the main cylindrical body 23 to urge the locking parts 27 and 28 to separate from each other.

The locking member 26 which is a combination of the above-described locking parts 27 and 28 is fitted into the rectangular hole 25 of the main cylindrical body 23 in such a way that the plug hole 35 of the locking member 26 is aligned with the hole 21 of the main cylindrical body 23 and that the locking parts 27 and 28 can get close to and separate from each other. The rectangular hole 25 in the main cylindrical body 23 is made to have a width a little larger than the thickness of the ring-shaped members 31 and 34 which are placed one upon the other, so that the ring-shaped members 31 and 34 can be controlled to move not up and down but in the traverse direction.

When the locking member 26 is to be fitted into the rectangular hole 25, the ring-shaped members 31 and 34 which are placed one upon the other are inserted into the rectangular hole 25 at first and the push pieces 29 and 32 are then fixed to the back sides of the ring-shaped members 31 and 34 by means of the fixing pieces 39 and 40.

Figure 2:
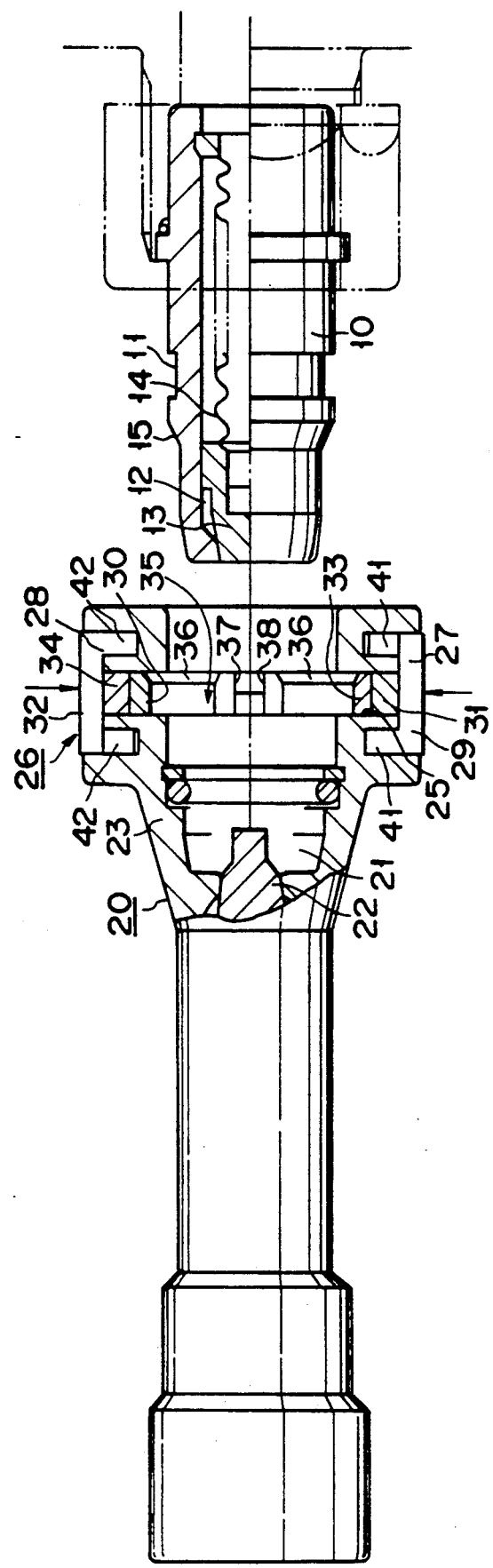
FIG. 2 is a partially-sectioned side view showing the socket and the plug ready for connection.

As shown in FIG. 1, the locking member 26 inserted into the rectangular hole 25 of the main cylindrical body 23 of the socket 20 causes its locking parts 27 and 28 to be urged to separate from each other by means of its springs 41 and 42 which are pressed against the main cylindrical body 23, so that the plug hole 35 formed by the ring-shaped pieces 30 and 33 of the locking parts 27 and 28 can be kept narrow. When the push pieces 29 and 32 are pushed to cause the locking parts 27 and 28 to come close to each other against the springs 41 and 42, the plug hole 35 can be widened as shown in FIG. 2.

Figure 3:
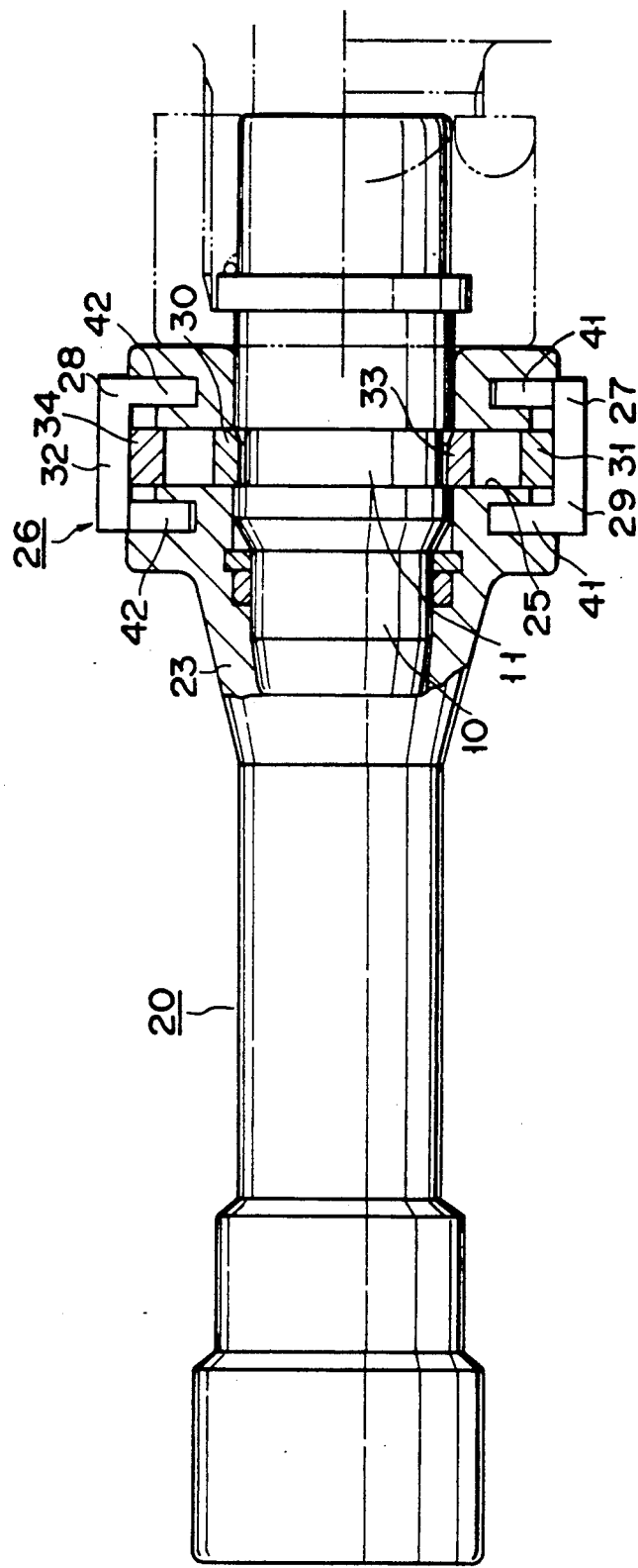
FIG. 3 is a partially-sectioned side view showing the socket and the plug connected.
Figure 6:
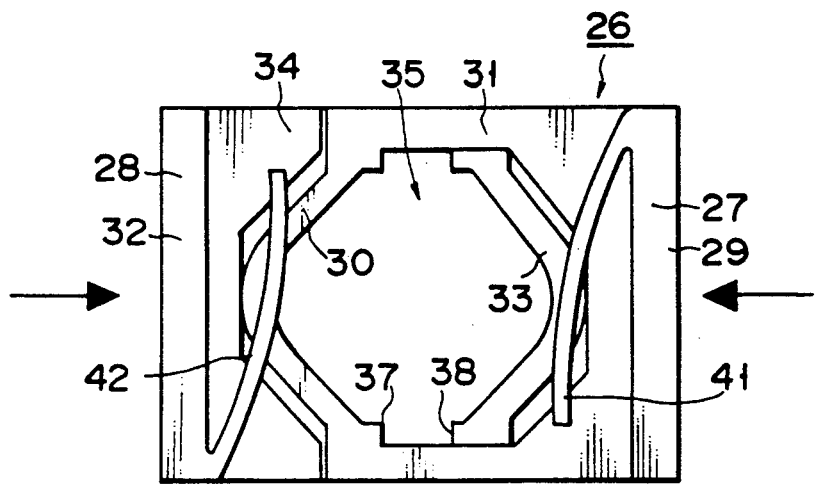
FIG. 6 shows the locking member whose plug hole is widened.

When the plug 10 is to be connected to the socket 20 which has the above-described locking member 26, the locking parts 27 and 28 are caused to come close to each other so as to widen the plug hole 35. The plug 10 is inserted into the main cylindrical body 23 of the socket under this state. When the locking groove 11 on the outer circumference of the plug 10 reaches the inside of the plug hole 35 formed by the locking parts 27 and 28 and these locking parts 27 and 28 are released from their being pushed, they are separated from each other by the springs 41 and 42, as shown in FIG. 3. As the result, the plug hole 35 is made narrow and the ring-shaped pieces 30 and 33 which form the plug hole 35 are engaged with the locking groove 11 on the outer circumference of the plug 10, so that the socket 20 and the plug 10 can be connected to each other.

When the plug 10 thus connected is to be detached from the socket 20, the push pieces 29 and 32 are again pushed to cause the locking parts 27 and 28 to come close to each other. When the plug hole 35 is thus widened, the ring-shaped pieces 30 and 33 are released from the locking groove 11 on the plug 10, thereby enabling the plug 10 to be separated from the socket 20.

A tapered face 15 is formed on that outer circumference of the plug 10 which is nearer to the front end of the plug 10 than the locking groove 11 is, as shown in FIG. 1. When the plug 10 is inserted into the main cylindrical body 23 of the socket 20, the tapered face 15 on the plug 10 is struck against the tapered face 36 of the ring-shaped pieces 30 and 33 of the locking member 26. When the plug 10 is further pushed, the tapered face 15 serves as a guide to get the locking parts 27 and 28 close to each other against the springs 41 and 42 to widen the plug hole 35. When the locking groove 11 on the plug 10 reaches the inside of the plug hole 35, the ring-shaped pieces 30 and 33 are released from their being pressed by the tapered face 15 and they are engaged with the locking groove 11 on the plug 10 by the springs 41 and 42. One touch connection between the socket 20 and the plug 10 can be thus achieved.

Although the elastic tongues extending from the push pieces 29 and 32 of the locking parts 27 and 28 have been used as the springs 41 and 42 interposed between the locking member 26 and the main cylindrical body 23 to separate the locking parts 27 and 28 of the locking member 26 from each other, the present invention is not limited to these elastic tongues.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. In a coupling socket having a plug including a locking groove and a first bore, a socket including a second bore having an axis, said bores lying in communication one with the other upon coupling the plug and socket to one another, and a locking means for engagement with the locking groove on said plug is connected to said socket, said coupling socket including a main cylindrical body about and defining said second bore, a plug-receiving portion opening through the end of said socket which receives said plug and a rectangular opening extending perpendicular to the second bore and formed in the plug-receiving portion, said locking means including a pair of locking parts each having an enclosed ring-shaped piece, said ring-shaped pieces being spaced from one another in a direction parallel to the axis of said second bore and engageable with the locking groove on said plug, said ring-shaped pieces lying in axially spaced overlapping relation one to the other and jointly defining a plug-receiving aperture, said locking parts being movable toward and away from one another and being configured such that said plug-receiving aperture is enlarged in response to movement of said locking parts toward one another and is narrowed in response to movement of said locking parts away from one another, spring means interposed between said main cylindrical body and each locking part for urging the locking parts for movement away from one another, said locking means being fitted into the rectangular opening of the main cylindrical body such that the first and second bores lie in communication with one another when said ring-shaped pieces of said locking parts engage in said locking groove, the locking parts of the locking member having push pieces formed on end portions thereof operable externally of said body, said spring means including elastic elements formed integral with the push pieces and resiliently bearing directly against the main cylindrical body.

2. The coupling socket according to claim 1 wherein the ring-shaped pieces have tapered faces formed on the inner circumference of the edge thereof and facing the end of the socket which receives the plug.

* * * * *